United States Patent
Hu

(10) Patent No.: US 6,191,776 B1
(45) Date of Patent: Feb. 20, 2001

(54) COMPACT KEY STRUCTURE

(75) Inventor: Gino Hu, Taipei (TW)

(73) Assignee: Silitek Corporation, Taipei (TW)

(*) Notice: Under 35 U.S.C. 154(b), the term of this patent shall be extended for 0 days.

(21) Appl. No.: 09/225,715

(22) Filed: Jan. 6, 1999

(51) Int. Cl.$^7$ ................................................. G09G 5/00
(52) U.S. Cl. ........................... 345/168; 200/5 A; 400/479
(58) Field of Search ................................ 345/156–172; 341/22–25; 200/5 A, 5 D, 5 E, 52 R, 343; 400/476, 479, 485, 491.2

(56) References Cited

U.S. PATENT DOCUMENTS

| Re. 30,435 | * | 11/1980 | Fukao | 200/159 R |
|---|---|---|---|---|
| 4,472,609 | * | 9/1984 | Lamm et al. | 200/5 A |
| 4,584,444 | * | 4/1986 | Nagashima | 200/52 R |
| 4,659,879 | * | 4/1987 | Hasegawa | 200/5 A |
| 4,736,076 | * | 4/1988 | Mochizuki et al. | 200/52 R |
| 4,822,959 | * | 4/1989 | Schwab | 200/5 A |
| 4,877,347 | * | 10/1989 | Haftmann et al. | 400/479 |
| 5,268,545 | * | 12/1993 | Bruner | 200/345 |
| 5,534,860 | * | 7/1996 | Phillips et al. | 341/22 |
| 6,004,051 | * | 12/1999 | Hu | 400/491.2 |
| 6,005,209 | * | 12/1999 | Burleson et al. | 200/343 |

* cited by examiner

Primary Examiner—Steven J. Saras
Assistant Examiner—Srilakshmi Kumar
(74) Attorney, Agent, or Firm—Rosenberg, Klein & Lee

(57) ABSTRACT

A compact key structure comprises a base plate, a conductive membrane, an elastic member, a frame and a cap wherein said key structure is characterized in that the conductive membrane is single-film structure and has a contact corresponding to each key and with meshed-hook shape ⊋. An aperture is provided at the center of the contact for venting air. The elastic member and the cap are attached by a non-reactive type paste such that the elastic member and the cap can be attached and separated repeatedly. The surface of said elastic member attached to said cap is of staircase shape and has venting holes formed on the lateral side to facilitating the restoring of the elastic member after being pressed. Moreover, a conductive bump is provided within the elastic member and corresponding to the conductive membrane. A conductive layer is formed on the conductive layer and corresponding to the contact of the conductive membrane. The conductive bump of the elastic member is connected to the contact of the conductive membrane and a closed loop is formed within the key when the cap is pressed down, whereby the signal generated by key stroking action is transmitted to the computer. The conductive membrane is designed to be single-film structure, whereby the keyboard is more compact with reduced height.

4 Claims, 4 Drawing Sheets

COMPACT KEY STRUCTURE

FIELD OF THE INVENTION

The present invention relates to a compact keyboard, more particularly, to a compact keyboard the conductive membrane thereof, is designed to be single-film structure, whereby the keyboard is more compact with reduced height.

BACKGROUND OF INVENTION

The conventional conductive membrane of computer key is generally composed of two or three stacking conductive films such that the height of the key is hard to scale down. Moreover, the conductive membrane may have the problem of poor contact if one of those stacking films is obliquely placed.

Therefore, it is an object of the present invention to provide a compact key structure, which also has reduced cost.

In one aspect of the invention, the present invention provides a key structure comprising base plate, elastic member, frame and cap wherein the conductive membrane thereof is single-film structure, the contact of the conductive membrane corresponding to each key is of meshed-hook shape ⊇, a venting. aperture is provided at the center of the contact. Moreover, the bump of the elastic member is provided a conductive layer corresponding to the contact of the conductive membrane such that the bump will touch the contact of the conductive membrane and a closed loop, within the key is formed when the cap is pressed down.

In another aspect of the present invention, the elastic member is attached with the cap by adhesive which has no chemistry reaction and can be repeatedly used.

In still another aspect of the present invention, the surface of the elastic member attached to the cap is of staircase shape and has venting holes formed on the lateral side such that the air within the elastic member flows out from a venting aperture when the elastic member is pressed down, and the air flows in from at least one venting holes when the elastic member is released.

The various objects and advantages of the present invention will be more readily understood from the following detailed description when read in conjunction with the appended drawing, in which:

DETAIL DESCRIPTION OF PREFERRED EMBODIMENT

Figure 1:
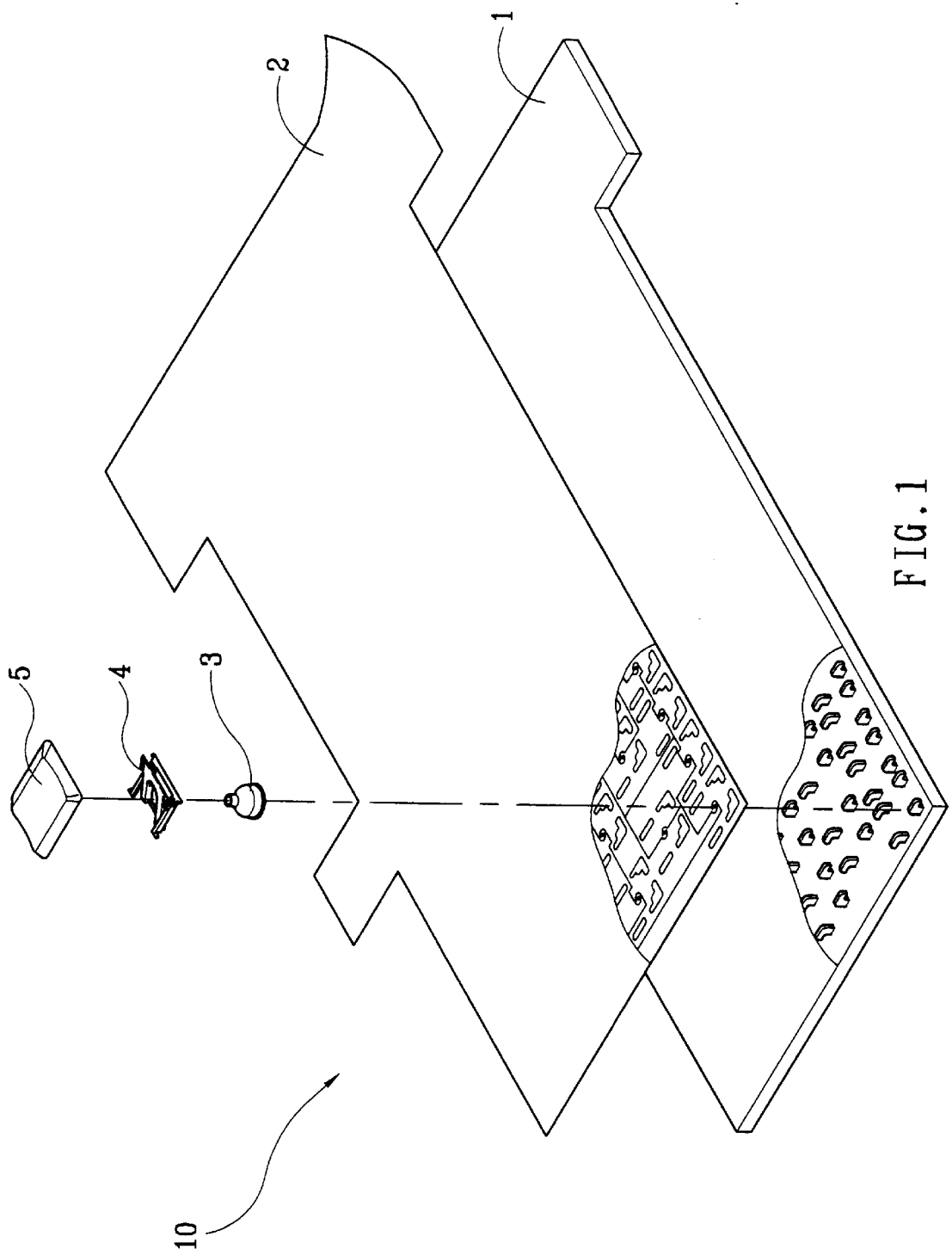
FIG. 1 is the exploded view of the invention key structure.
Figure 2:
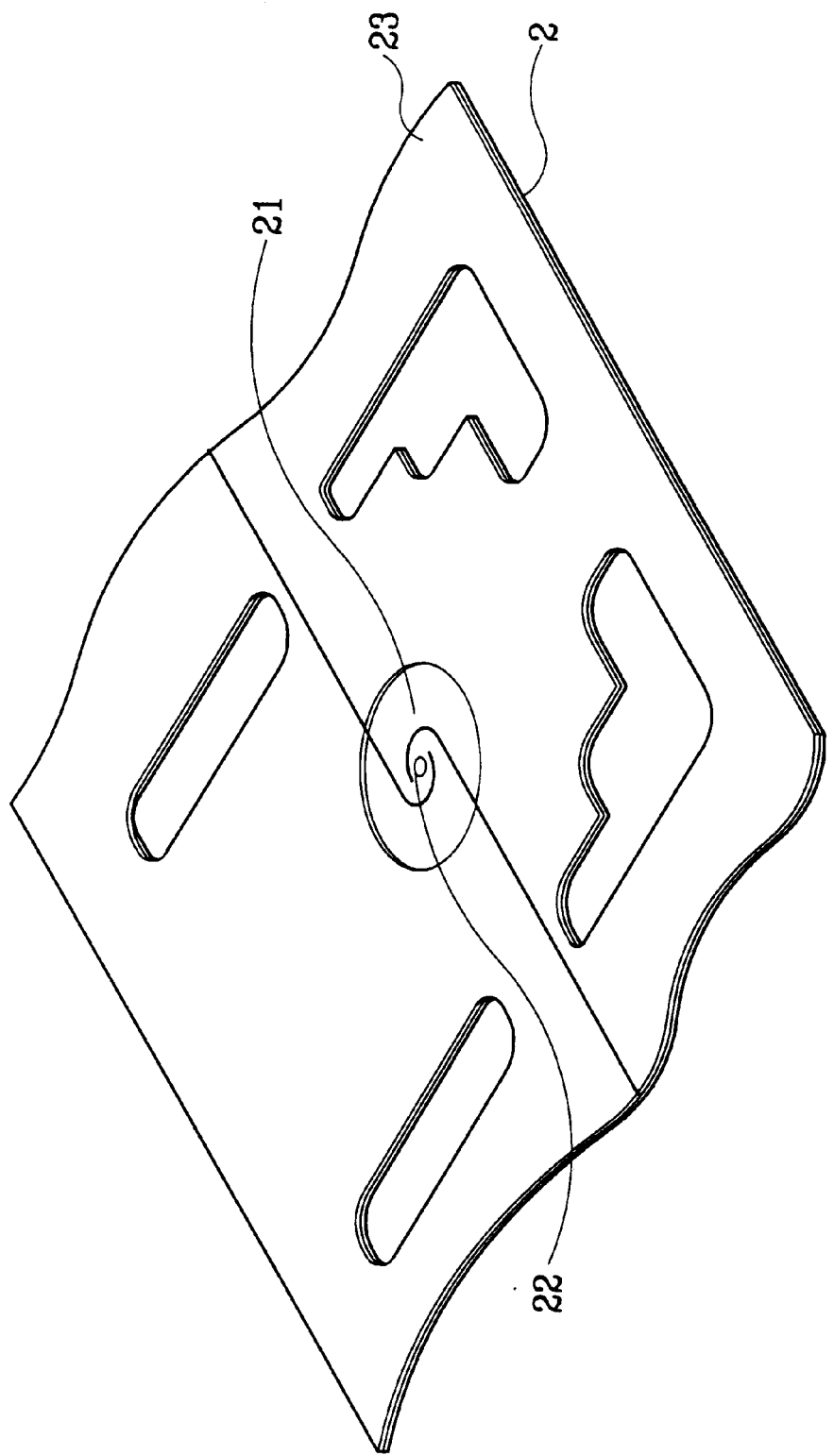
FIG. 2 is the schematic view of the conductive membrane in the invention.

As shown in FIG. 1, the inventive key 10 comprises a base plate 1, a conductive membrane 2, an elastic member, a frame 4 and a cap 5 and the descriptions about the base plate 1, the frame 4 and a cap 5 are omitted because they are well-known art. With reference now to FIG. 2, the conductive membrane 2 is single-film structure and has contact 21 formed at the location corresponding to the key 10. The contact 21 is of mesh-hooks shape ⊇ a venting aperture 22 is formed at the center of the contact 21. Moreover, an insulating film 23 is coated on the conductive membrane 2, which is not overlapped with the contact 21, thus preventing the short circuit of the conductive membrane 2 with other circuit.

Figure 3:
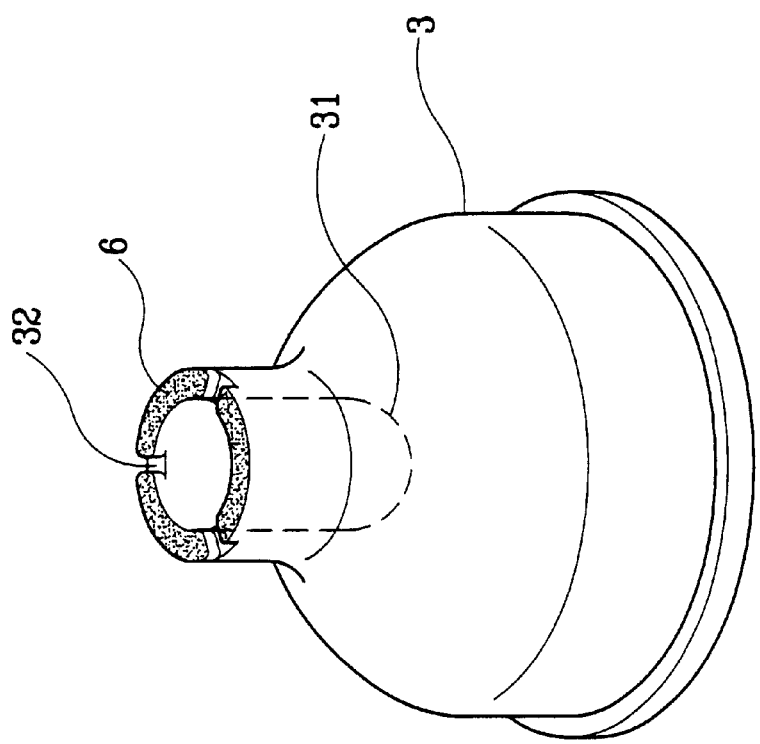
FIG. 3 is the perspective view of the elastic member in the invention.
Figure 4:
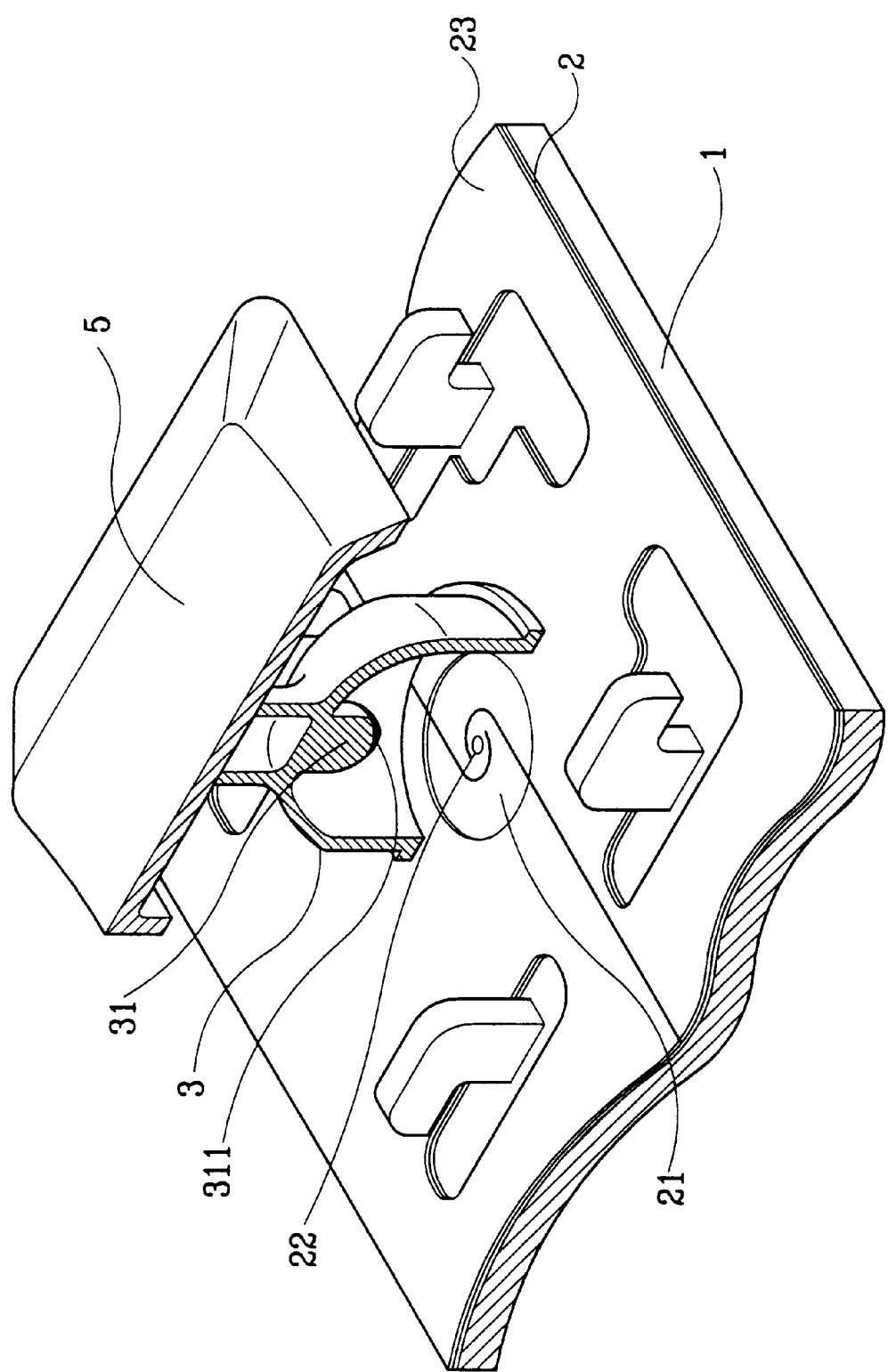
FIG. 4 is a view showing the assembling of the invention.

As shown in FIGS. 3 and 4, the elastic member 3 is of dome-shape and is provided with a conductive bump 31. The conductive bump 31 has a conductive layer 311 at location corresponding to the contact 21 of the conductive membrane 2. Moreover, the elastic member 3 is attached with the cap 5 by adhesive 6 which is non-reactive paste such that the cap 5 can be still attached to the elastic member 3 after repeated assembling and disassembling. The attached surface of the elastic member 3 with the cap 5 is staircase shape and has at least one venting hole 32 formed on the lateral side.

With reference now to FIGS. 1 and 4, when assembling the base paltel, the conductive membrane 2, the elastic member 3, the frame 4 and the cap 5 together, the larger and of the elastic member 3 touches the contact 21 of the conductive membrane 2, and the conductive bump 31 of the elastic member 3 is placed corresponding to the meshed-hook shape ⊇ contact 21. Moreover, the cap 5 is attached to the smaller end of the dome-shape elastic member 3 by adhesive 6. In this way, the conductive bump 31 of the elastic member 2 is connected to the contact 21 and a closed loop is formed within the key when the cap 5 is pressed down, whereby the signal generated by key stroking action is transmitted to the computer.

In the invention, at least one venting hole 32 is formed on the end of the elastic member 3 attached to the cap 5 such that air within the elastic member 3 flows out from the aperture 22 of the conductive membrane 2 when the cap 5 is pressed down, and air flows in from the venting holes 32 to restore the shape of the elastic member 3 when the pressing force is removed.

To sum up, by the structure of the inventive key, the height of the key can be reduced and the lost thereof is also reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A compact key structure comprising a base plate, a conductive membrane, an elastic member, a frame and a cap wherein said key structure is characterized in that:

said conductive membrane is single-film structure, the contact of said conductive membrane corresponding to each key is of meshed-hook shape ⊇, a conductive bump being provided within said elastic member and corresponding to said conductive membrane, said elastic member and said cap being attached by a non-reactive type paste such that said elastic member and said cap can be attached and separated repeatedly.

2. The compact key structure as in claim 1, wherein an aperture is provided at the center of said contact for venting air.

3. The compact key structure as in claim 1, wherein the surface of said elastic member attached to said cap is of staircase shape and has venting holes formed on the lateral side.

4. The compact key structure as in claim 1, wherein an insulating film is coated on said conductive membrane, which is not overlapped with said contact, thus preventing the short circuit of said conductive membrane with other circuit.

* * * * *